April 21, 1959
H. J. ALTWICKER
2,882,759
DIE INSERTS
Filed May 21, 1957
2 Sheets-Sheet 1
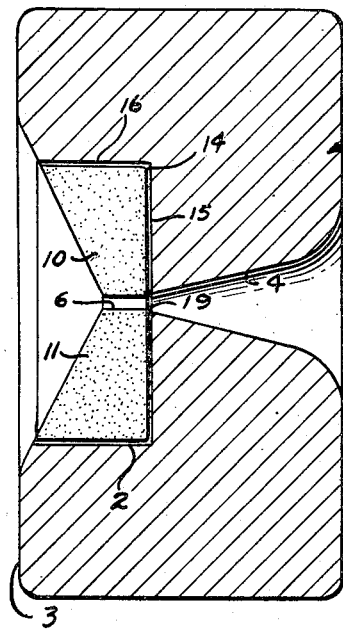
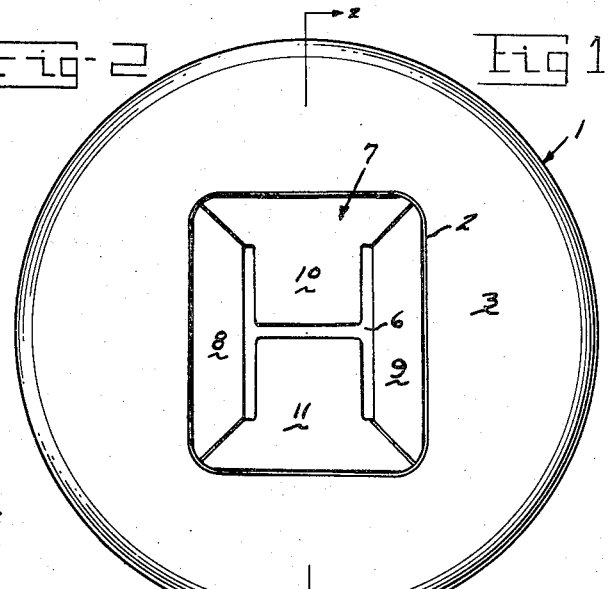
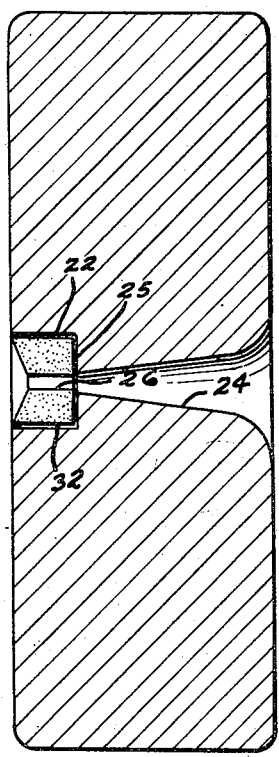
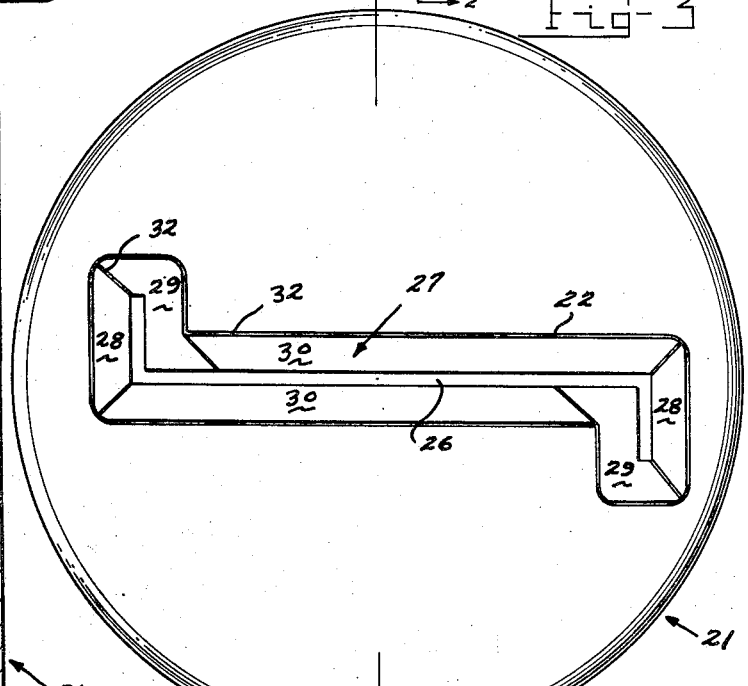
INVENTOR.
HUBERT J. ALTWICKER
BY Jerome P. Bloom
HIS ATTORNEY April 21, 1959     H. J. ALTWICKER     2,882,759
DIE INSERTS
Filed May 21, 1957     2 Sheets-Sheet 2
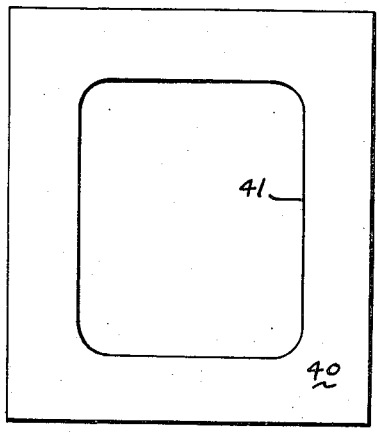
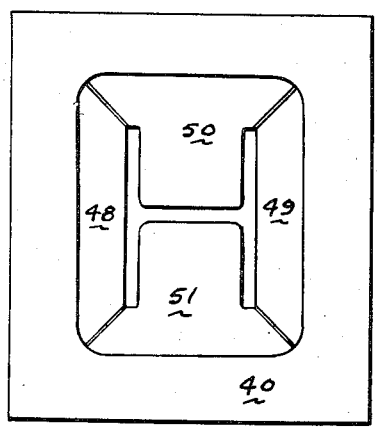
Fig-6     Fig-5     Fig-7
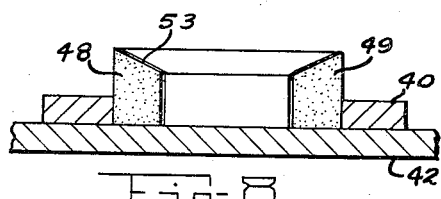
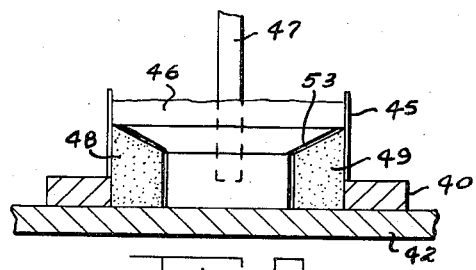
Fig-8     Fig-9
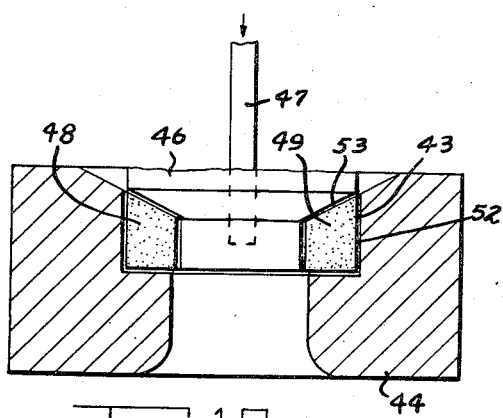
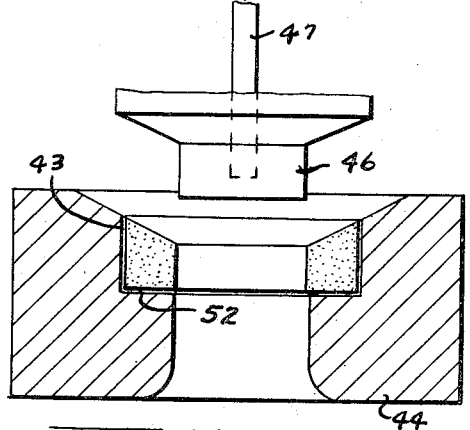
Fig-10     Fig-11
INVENTOR.
HUBERT J. ALTWICKER
BY
Jerome P. Bloom
HIS ATTORNEY United States Patent Office 2,882,759
Patented Apr. 21, 1959

2,882,759
DIE INSERTS
Hubert J. Altwicker, Dayton, Ohio
Application May 21, 1957, Serial No. 660,579
11 Claims. (Cl. 76—107)

This invention relates to improvements in extrusion dies and more particularly to segmented inserts for extrusion dies and a method for providing dies with such inserts. Segmented inserts as provided by the invention substantially increase the operating life of extrusion dies to which they are applied and enable superior extrusion products of precision dimension and machine-like finish. They are particularly advantageous as applied in the extrusion of structural elements and large dimensioned thin walled members.

In the extrusion process, metal is forced through a shaped orifice in an extrusion die to effect a member having a desired cross-sectional configuration. The shape of the extrusion orifice often becomes more or less asymmetrical when structural sections are to be extruded. In the instance of asymmetrical extrusions, the load on the die becomes particularly severe and serious erosion or wash-out effects can result in the working surface of the die about the extrusion orifice. This causes the extrusion to have an unacceptable surface appearance, an irregular external configuration, and unsatisfactory dimensional tolerances.

Efforts have been made in the prior art to meet this problem. In some instances the surfaces of the extrusion die about the orifice through which hot metal is to flow has been face hardened. Hard metal alloys like Stellites are welded around and upon the bearing land of the extrusion die in this process in efforts to increase the wear resistance of the die and prevent undesirable changes in the orifice dimension in the extrusion operation. This has not proven to be a solution.

Another device employed in the prior art in efforts to reduce wear and prolong the operating life of extrusion dies is to provide the dies with inserts made of metal carbides or oxides, preferably aluminum oxides. It is to be noted that the use of inserts of oxides is recent and still in the experimental stage. These inserts are generally in the form of a single disc or thick walled cylinder which is seated in a die body of steel and provided with a particularly formed orifice in its center. The projected area of inserts so provided is substantial and they present many drawbacks and disadvantages in their fabrication.

The drawbacks and disadvantages of prior art methods of meeting the above indicated problems in extrusion dies are many and will be particularly pointed out in the description of the subject invention which follows.

The present invention affords improved extrusion die units. A particularly advantageous die is effected by providing carbide or oxide inserts of a segmented nature which are applied to the basic die body of steel, or the like, in a simple, yet effective manner. The segmented inserts are so formed and so applied as to substantially eliminate undesirable working stresses in their application to extrusion dies. Moreover, the subject invention provides a simple, yet novel method of providing extrusion dies with segmented inserts which maintains their unit cost at a minimum, substantially increases die efficiency, and prolongs their operating life.

A primary object of the invention is to simplify and improve extrusion dies and their method of fabrication, whereby such dies may not only be economically manufactured, but will be more efficient and satisfactory in use, adaptable to a wide variety of applications, and have a longer efficient operating life.

An object of the invention is to provide an improved die having segmented inserts.

A further object of the invention is to effect an improved extrusion die by providing it with segmented inserts defining the extrusion orifice in a manner to reinforce the die in areas where they are usually subject to stress concentration.

An additional object of the invention is to provide an improved extrusion die having a working insert defining the extrusion orifice wherein the insert is so shaped and so seated in the die cavity that the critical edges of the insert where the hot metal leaves the orifice during extrusion are well supported and backed up by the steel of the die body.

Another object of the invention is to provide an improved extrusion die employing a segmented insert defining the extrusion aperture and so connected and formed that shear stresses are substantially eliminated and the insert material is advantageously kept under compression stresses in the extrusion process.

Another object of the invention is to effect a simplified method of providing extrusion dies with segmented inserts.

A further object of the invention is to provide extrusion dies with segmented inserts so related in component structure that capital costs of equipment for fabricating such inserts is substantially reduced.

An additional object of the invention is to provide an improved die unit so fabricated to eliminate high stress concentration and the harmful effects of thermal gradients in operation.

A further object of the invention is to provide an improved extrusion die possessing the advatageous structural features, the inherent meritorious characteristics, and the mode of operation herein described.

With the above and other incidental objects in view, as will more fully appear in the specification, the invention intended to be protected by Letters Patent consists of the features of construction, the parts and combinations thereof, and the mode of fabrication and operation as hereinafter described or illustrated in the accompanying drawings or their equivalents.

Referring to the accompanying drawings, wherein are shown illustrative, but obviously not necessarily the only forms of embodiment of the invention;

Fig. 1 shows a plan view of the working face of an extrusion die in accordance with the invention;

Fig. 2 shows a cross-sectional view of the die unit of Fig. 1 taken along line 2—2 thereof;

Fig. 3 shows a plan view of a die unit employing a modification of the invention as illustrated in Fig. 1;

Fig. 4 is a cross-sectional view taken along line 4—4 of Fig. 3;

Fig. 5 shows a plan view of a template such as employed in the practice of the invention method;

Fig. 6 is a cross-sectional view of the template of Fig. 5;

Fig. 7 is a plan view showing the initial insertion of the segments of the invention insert to the template of Fig. 5;

Fig. 8 is a cross-sectional view indicating the assembly of the insert segments to the template as indicated in Fig. 7;

Fig. 9 shows the method of bonding the segments of the insert for removal from the template by a cross-sectional view;

Fig. 10 shows the unit application of the insert segments in an extrusion die cavity; and Fig. 11 shows the removal of the insert bonding vehicle from the segmented insert as seated in the die cavity.

The invention can be best described with reference to the drawings. Figs. 1–4 illustrate a segmented insert as provided in extrusion dies in accordance with the invention. The die unit of Fig. 1 is specific to the extrusion of H-sections. The die body 1 is of steel and provided with a central, substantially rectangular cavity 2 in its working face 3. It should be noted that the corners of the cavity 2 are rounded for purposes to be further described. The cavity 2 is in communication with a substantially H-shaped aperture 4 which opens outwardly of the exit face 5 of the die body and it is tapered from the die cavity to gradually expand to the exit face 5.

As shown, the segmented insert assembly 7 is fabricated of sintered alumina and consists of four segments 8, 9, 10, and 11, mutually defining an H-shaped orifice 6 therebetween. Segments 8 and 9 are identical in configuration and oppositely disposed in the cavity 2 of the die body to define the outer walls of the H-shaped orifice by their innermost parallel sides. The segments 10 and 11 are also identical and mutually define the innermost configuration of the H-shaped orifice 6 through which the H-section is to be extruded. The mating edges of the segments 8, 9, 10, and 11 abut and match at 45° angles to define separation lines which run out from the outermost points of the H-shaped orifice. These mating edges of the segments are provided with a coat of soft oxide or the like which affords a pressure dispersing layer in critical areas of the insert as the segments are shrunk-fit in the die cavity. This arrangement of the separation lines is very important since they run out at points where severe notch effects generally occur in the single piece round inserts employed in the prior art. In prior art steel dies, for example, cracks show up in these areas after relatively short periods of service.

It should be noted here that while the segmented insert illustrated is formed of sintered alumina, the invention embodiment is also advantageous in effecting segmented inserts of carbide or oxide, as will become more evident herein.

A layer 14 of soft oxide or the like is also coated about the surfaces of the segmented insert which seat to the base 15 and side walls 16 of the cavity 2 as the assembled segments are shrunk-fit therein. This layer 14 disperses pressures and effects a smooth, uniform contact of the segments to the die body.

The seating of the segmented insert 7 disposes the H-shaped orifice 6 in axial alignment with the exit aperture 4 defined by the die neck. As will be evident from Fig. 2 of the drawings, the orifice 6 is slightly smaller in dimension than the H-shaped aperture 4 at the base of the die cavity 2 and its dimension is at a minimum at the base 15 of the die cavity. Accordingly, the base of the insert 7 is substantially fully supported and fully backed by the steel of the die body 1 and this insures that in the extrusion process the critical edges 19 of the insert, where the hot metal leaves the bearing land provided by the assembly of the segmented insert to the die body, are fully supported and stabilized by the steel of the die body. Such an arrangement puts and keeps the material of the insert under compression stresses so the insert material cannot be sheared away by the outgoing hot metal as it passes from the extrusion orifice 6 into the exit aperture 4. This is of importance and decisive in effecting a prolonged operating life for carbide and ceramic dies fabricated in accordance with the invention. Also, the expanding nature of the H-shaped exit aperture 4 insures that the hot metal extruded through the segmented insert will not contact the wall defining the aperture 4 as the exruded metal leaves the die body. The extrusions will be of precision character and have close tolerances.

Referring to Fig. 2 of the drawings, the segments 8, 9, 10, and 11 have their outermost faces uniformly inclined to the extrusion orifice 6 defined thereby. This feature in conjunction with the details hereinbefore recited insures a maximum compression effect as hot metal is introduced to the extrusion orifice and assists in the maintenance of the segmented insert in its substantially fully supported relation to the cavity base 15. The individual insert segments have a high section modulus and are relatively thin walled to offer a minimum of projected area in relation to the working pressure applied. They thus provide increased resistance and safety against harmful effects of bending stresses so detrimental to extrusion dies of the prior art. This form of insert segment also results in elimination of harmful thermal effects common in the use of the single element insert. As the hot metal is extruded through the orifice 6, there will be a minimum temperature gradient due to the thin walls of the segments, thereby avoiding the thermal stresses common in the prior art dies which have a substantial projected area and wide temperature gradients throughout. These thermal problems have seriously curtailed the service life of dies employing inserts of a single unit nature as provided in the prior art. This is due to the fact that the rate and range of thermal stresses become greater with increasing size of the working parts and are at an absolute minimum in the employment of the segmented insert in accordance with the invention and therefore they inherently avoid unfavorable temperature gradients in operation.

The segments of the insert thus provided so interlock that their relative position is fixed in the die body, yet they are so related by the interposed soft pressure dispersing layers that they can breathe in service and thus avoid high local stress concentrations which are so detrimental with reference to die life and performance.

The fabrication of die inserts in segmented fashion as provided by the invention has further advantages in the art considering the fact that carbide or oxide inserts are made from powder or at least from fine grain material that has to be pre-compressed before the actual sintering process takes place to finalize the inserts. For example, inserts of alumina might require a specific pressure up to 15,000 pounds per square inch of projected area of the insert for pre-compression prior to sintering. The smaller the projected area of the insert, the smaller the total pressure required for pre-compressing. Thus, a single piece insert in accordance with the prior art with a projected area of 100 square inches would require 1,500,000 pounds pressure, while if the insert were made in 10 segments, equipment having a pressure capacity of only 150,000 pounds would be necessary for pre-compression, assuming the components of the insert were substantially the same in size. Thus, the invention eliminates the necessity of larger and more expensive pressure equipment for pre-compressing die inserts of carbide or oxide or the like.

To repeat, the separating lines are provided in the segmented insert in the areas where high stress concentrations are known, to result in the extruding process. In this manner, the invention provides that stress conditions are relieved and harmful notch effects are eliminated.

Figs. 3 and 4 of the drawings show an extrusion die for a relatively wide and thin walled structural section. Extrusions of this nature are more difficult and the prior art inserts available for this type of extrusion require much larger pressures for pre-compression in fabrication than is necessary in the employment of the subject invention, as previously noted in the description of the embodiment of Figs. 1 and 2 of the drawings. The invention is particularly advantageous in application to this type of extruded shape. The extrusion orifice 26 in this embodiment is defined by a narrow band, segmented insert assembly 27 to provide for extrusion of a member having a relatively large thin wall with flanges at right angles thereto and oppositely directed at its lateral extremities.

As will be seen from Fig. 3 of the drawings, the insert assembly 27 is fabricated of three pairs of segments, 28, 29, and 30, having their matching or abutting extremities separated by a soft oxide or metal coating 32 and formed at approximately 45° angles. Again, the lines of separation of the insert segments extend from the critical corners of the orifice 26 defined thereby. This segmented insert 27 is seated in the cavity 22 in a steel die body 21, separated from the cavity base 25 and its side walls by a soft coating 32 as in the first described embodiment of the invention. Here, also, the exit aperture 24 defined by the die neck gradually expands from a configuration similar to and slightly greater in dimension than the orifice 26 to the exit face of the steel die body. Since the relationship of the segments of the insert to each other and to the die body are similar to that as described with reference to the embodiment of Figs. 1 and 2 of the drawings, repetitious description will be avoided.

In providing segmented inserts of the nature illustrated in Figs. 3 and 4 of the drawings, it will be readily obvious, as previously explained, that there is a considerable reduction in cost of fabrication of extrusion dies with inserts as compared to the prior art. As is evident, the base of the segmented insert in the critical areas adjacent and about the exit from the extrusion orifice contacts and lies in a plane common to the cavity base 25 and defines the precise dimension of the extruded section. The base of the segmented insert is substantially completely and fully supported and backed by the steel of the die body which enables the precise clean cut extrusions of a relatively finished nature.

The various advantages and economies previously enumerated with respect to the first described embodiment are even more evident in this embodiment, which is directed to more difficult and larger extrusions and it is believed that these need not be repeated. To summarize, the subject invention as applied to a multi-segment insert for extrusion dies to be applied to thin wall structures creates a substantially improved die unit which is subject to minimum stress in operation.

The major problem which has prevented any successful development and use of segmented inserts has been due to the difficulty of incorporating the insert in segment form into a die cavity. The present invention affords a simple and effective method for providing dies with segmented inserts. As will be seen, the invention provides that any number of insert segments can be combined into one simple package in a manner to insure accurate and tight seating of each segment within the die cavity. In one area, this method could be called ceramic hard facing of extrusion dies.

For illustration, a die of the nature shown in Figs. 1 and 2 of the drawing may be considered. In the invention method, a steel template 40, as shown in Figs. 5 and 6 of the drawing, must be first made and formed with a central aperture 41 having a configuration conforming to the external shape of the segmented insert to be formed.

This template is placed on a flat base plate 42. Then, the precisely ground insert segments 48, 49, 50, and 51 are seated to the base plate 42 within the aperture 41 in the relative position they are to seat in the cavity 43 of the die body 44. The relatively abutting faces of the segments are preferably angled at substantially 45° and prior to their seating in the template aperture have a soft coating of metal or the like applied to their relatively abutting faces. After the assembly of the segments on the base plate within the template, the internal surfaces of the segments defining the extrusion aperture and the outer working faces of the inserts are painted or covered with any agent 53 of mold- or contact-releasing capacity. A covering of oil and talc gives excellent results. Following this, the portions of the assembled segments outwardly of the template are surrounded and confined by a wrap of commercial tape or plastic strip 45 which projects upwardly relative the segments to provide a vertical extending and containing housing.

As shown in Fig. 9 of the drawings, liquid plaster 46 is introduced within the strip housing 45 to enter and fill the aperture defined by the segments 48—51 and flow over the working surfaces of the segments, filling the extended strip housing 45 thereby. A handle 47 is stuck in the plaster which is then left to solidify.

When the plaster has solidified, it has effected a union with the assembled segments and the whole mass with the segments can then be lifted from the template 40. The strip housing 45 is now unwrapped from the unit and the segments are ready for insertion in the die cavity 43 of the extrusion die body 44.

The outer surfaces of the so combined insert segments, which seat to the base and side walls of the die cavity are coated with a soft coating of ceramic of metallic nature 52. The die body has been preheated to a temperature below the drawing temperature of the steel of which it is formed in order to provide shrinkage clearance for the insert unit which is then seated in the die cavity. The unit package absorbs heat from the pre-heated die body and this causes the oil and talc layer between the plaster body and the insert segments to become liquid. Under this condition, the plaster head 46 is separated and can be easily lifted from the assembled segments of the insert by grasping the handle 47.

The segments are now accurately seated in the die cavity and clamp tightly into the die body by the effect of shrinkage forces set up by cooling of the die body.

After removal, the plaster head 46 can itself serve to check inside dimensions of the insert assembly or the shape to be extruded.

The simplicity and effectiveness of the invention method is believed self-evident. The employment of external configurations for the assembled insert segments providing substantially rounded corners facilitates a bond of maximum accuracy between the assembled segments and the die body in a simple fashion. The use of rounded corners as provided by the invention also reduces stress problems in use.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprises an illustrative form of several modes of putting the invention into effect and the invention is therefore claimed in any of its forms or modifications within the legitimate and valid scope of the appended claims.

Having thus described my invention, I claim:

1. A method of providing segmented inserts in a die cavity comprising, forming the inserts in segments, releasably confining the segments in their assembled form by a peripheral extension from one face thereof, filling the peripheral extension with a paste-like mass adapted to solidify on exposure, the mass internally filling and bonding to the segments in the process to fix them in their assembled form and form a package therewith with the segments as a base, incorporating a removal element in said mass prior to solidification, removing the package from the peripheral extension, placing the package in the cavity of the die and inducing a release of the mass from the assembled segments for removal while confining the segments in the cavity of the die.

2. A method of providing segmented inserts in a die cavity comprising, forming the inserts in segments, releasably confining the segments in their assembled form, applying a paste-like mass adapted to solidify on exposure over one face of the assembled segments, the mass internally filling and bonding to the segments in the process to fix them in their assembled form and form a unit package therewith with the segments as a base, removing the so assembled segments from confinement, and placing the package in the cavity of the die and inducing a release of the mass from said assembled segments while confining the segments in the cavity of the die.

3. A method of providing segmented inserts in a die cavity comprising the steps of, forming an insert in segments, peripherally confining the segments to their assembled form, painting the working faces of said segments with a substance having contact releasing capacity, applying a plaster-like substance to the outer-most face of the confined segments and filling an extrusion aperture defined thereby, permitting the plaster-like mass to solidify and bond to the assembled segments forming a unit package therewith with the segments as a base, releasing the peripheral confinement of said segments, placing the package segment base in the cavity of the die and inducing a release of the plaster-like mass from the assembled segments by subjecting the paint on the working faces of the segments to heat and confining the segments in the cavity of the die.

4. The method as set forth in claim 3 wherein the contact releasing paint consists of a layer of oil and talc and the additional step of coating the base of the segments as well as their peripheral wall with a pressure dispersing substance of soft metal or the like prior to application of the package in the cavity of the die.

5. A method of providing extrusion dies with segmented inserts including the steps of, forming the required insert in segment form, applying a soft pressure dispersing coating to the extremities of the insert segments, confining the segments in assembled condition to define the required extrusion aperture therebetween, covering and filling the assembled segments and the extrusion aperture therebetween by a material operative to bond to and integrate the segments and subject to release therefrom on application of heat, inserting the assembled segments in the cavity of an extrusion die by the medium of the bonding material, pre-heating said die body prior to insertion of the segments, the heat of the die body automatically effecting a release of the bonding material from the segments on seating thereof, the cooling of the die body effecting a shrink-fit of the insert segments in their appropriately assembled condition.

6. A method of providing extrusion dies with segmented inserts including the steps of, forming the required insert in segments, adhesively connecting the segments in their required assembled relation to form a package wherein the seating surfaces of the segments form the base of the package, pre-heating the die body to receive the segmented inserts and seating the package therein, removing the adhesive connecting means, the cooling of the die tightly and accurately shrink-fitting the assembled segments thereto.

7. A method of providing extrusion dies with a segmented insert in the cavity thereof comprising the steps of, forming the required insert in segments, forming a template having an aperture conforming to the peripheral configuration of the assembled segments, placing the segments of the insert in assembled relation within the template aperture, coating the inner periphery of the insert segments and their outermost faces with heat sensitive materials operative to liquefy on application of heat thereto, filling the aperture defined by the segments with a quick solidifying mixture to integrate the inserts thereto, removing the so integrated insert segments from the template, placing the assembled segments in the die cavity and shrink-fitting them thereto, the heat from the die body freeing the solidified mixture by liquefying said coating and removing the solidified mixture from the insert.

8. A method of providing an extrusion die with a segmented insert forming its working surface including the following steps; peripherally and freely confining the segments of an insert to their assembled form to define the desired extrusion aperture therebetween, introducing an adherent mass in the extrusion aperture of the segments and over one face thereof to bond thereto and maintain them in their assembled form, the segments forming the base of the mass, peripherally coating the outer wall and base of said segments with a soft metal or the like, seating the base of the segments in a cavity in the die body and shrink-fitting the segments in the cavity in the die body and removing the adherent mass therefrom.

9. A method of seating a segmented insert in a cavity in an extrusion die to form the working surface thereof comprising the steps of, forming the appropriate insert in segments mutually co-operable to define an extrusion aperture, temporarily containing said segments in assembled form, coating said segments at their working surfaces with a substance operative to produce a contact releasing film on application of heat, temporarily bonding said segments by an interior mass adhering to and maintaining a bond thereof, pre-heating the die body and inserting said segments in the cavity therein, the heat activating the contacting releasing film between said mass and said segments for removal of the mass, the cooling of the die body effecting a shrink-fit of the segmented insert thereto, said mass on removal constituting a gage means serving to check inside dimensions of the insert assembly or the shape to be extruded.

10. A method of providing extrusion dies with segmented inserts including the steps of forming the insert of separate components, internally connecting the segments in assembled relation, introducing said connected segments to the die body as assembled, removing the connecting means and shrink fitting the segments to the die body.

11. A method of providing an extrusion die with a segmented insert defining its extrusion aperture including the steps of forming the insert in separate sections, connecting said insert sections in assembled relation, introducing said connected sections in the die, removing the connecting means and shrink fitting said sections to the die.

References Cited in the file of this patent

UNITED STATES PATENTS

| 142,407 | Mullin | Sept. 2, 1873 |
| 221,985 | Tufts et al. | Nov. 25, 1879 |
| 233,337 | Du Bois | Oct. 19, 1880 |
| 935,463 | Coolidge | Sept. 28, 1909 |